(12) United States Patent
Burmeister

(10) Patent No.: US 8,395,527 B2
(45) Date of Patent: Mar. 12, 2013

(54) RECORDING DEVICE AND METHOD FOR MONITORING DEVICE PARAMETERS

(75) Inventor: Jens Burmeister, Eberbach (DE)

(73) Assignee: Cooper Crouse-Hinds GmbH, Soest (DE)

( * ) Notice: Subject to any disclaimer, the term of this patent is extended or adjusted under 35 U.S.C. 154(b) by 484 days.

(21) Appl. No.: 12/601,290

(22) PCT Filed: Feb. 22, 2008

(86) PCT No.: PCT/EP2008/001415
§ 371 (c)(1),
(2), (4) Date: Apr. 22, 2010

(87) PCT Pub. No.: WO2008/145203
PCT Pub. Date: Dec. 4, 2008

(65) Prior Publication Data
US 2010/0194589 A1    Aug. 5, 2010

(30) Foreign Application Priority Data

May 25, 2007   (DE) .......................... 10 2007 024 423

(51) Int. Cl.
*G08C 19/16*   (2006.01)
(52) U.S. Cl. .............................. 340/870.01; 340/870.02
(58) Field of Classification Search ............ 340/870.01, 340/870.02, 870.03, 870.06, 870.07, 870.08, 340/539.26
See application file for complete search history.

(56) References Cited

U.S. PATENT DOCUMENTS

| | | | | |
|---|---|---|---|---|
| 5,728,933 A | * | 3/1998 | Schultz et al. | 73/146.5 |
| 2005/0179562 A1 | * | 8/2005 | Ganz et al. | 340/870.07 |
| 2005/0258959 A1 | * | 11/2005 | Schnaare et al. | 340/539.26 |
| 2006/0052985 A1 | | 3/2006 | Ito et al. | 702/188 |
| 2007/0067063 A1 | * | 3/2007 | Ahmed | 700/275 |

FOREIGN PATENT DOCUMENTS

WO    WO 01/45471 A1    6/2001

OTHER PUBLICATIONS

Hageman, Elodie, Written Opinion of the International Searching Authority for PCT/EP2008/001415, pp. 1-17.

* cited by examiner

*Primary Examiner* — Joseph Lauture
(74) *Attorney, Agent, or Firm* — King & Spalding LLP

(57) ABSTRACT

The invention relates to a recording device that is associated with an operating medium specially protected from explosions, at a minimum for the collection, recording, and transmission of device parameters, having at least one data collection device, a memory device connected to said data collection device, and a data communication interface for transmission of the stored data to an external remote station. As a result, it is possible to determine corresponding device parameters in a simpler manner and at the same time to eliminate the need for time- and cost-intensive measures for accessing the operating medium on site.

16 Claims, 2 Drawing Sheets

RECORDING DEVICE AND METHOD FOR MONITORING DEVICE PARAMETERS

RELATED APPLICATIONS

This application is a Section 371 national phase application of and claims priority to PCT application PCT/EP2008/001415 filed on Feb. 22, 2008, which claims priority to German patent application number 10 2007 024 423.3 filed on May 25, 2007.

FIELD

The invention relates to a recording device associated with at least one specifically explosion-proof operating medium and to a method for monitoring device parameters of such an operating medium.

BACKGROUND

Corresponding operating media are employed in explosion-hazardous areas and have to be inspected with regard to different device parameters at certain time intervals. The inspection is carried out visually. A correspondingly trained person (user) moves to any one of the operating media to be monitored and performs an on-site inspection. Especially for lighting fixtures as one kind of such operating media a detailed on-site inspection is very time-consuming and cost-intensive. For example, it has to be made sure prior to a corresponding inspection that the lighting fixture is accessible. A standard mounting height for such a lighting fixture is two meters or more, so that the lighting fixture is not accessible without any auxiliary means.

So far, such an inspection and, if required, maintenance is done manually, and this also includes the recording of the corresponding device parameters in an inspection and test log book or also in a portable computer. The inspection of an operating medium, once terminated, is followed by a corresponding transport, for example, of the auxiliary means for accessing the operating medium, by a new set-up of this auxiliary means and by another time-intensive, manual inspection and ascertainment of corresponding device parameters of the operating medium.

SUMMARY

It is the object of the invention to provide a recording device and a corresponding method for monitoring device parameters, by means of which the corresponding device parameters can be ascertained in a more simplified manner while, at the same time, time- and cost-intensive measures for accessing the operating media on site may be waived.

This object is achieved with a recording device comprising the features of patent claim 1 and with a method comprising the features of patent claim 13.

According to the invention, a recording device is proposed, which is associated with a specifically explosion-proof operating medium. This recording device serves at least the collection, recording and transmission of corresponding device parameters. To this end, the recording device comprises at least one data collection device, a memory device connected to the same and a data communication interface for transmitting the stored data to an external remote station.

The recording device according to the invention may already be contained in the operating medium when mounted at a corresponding site, or it may be retrofitted.

According to the invention, a corresponding monitoring of the device parameters specifically of an explosion-proof operating medium is accomplished initially by collecting the device parameters from corresponding sensors, memory devices or the like of the operating medium, by storing the device parameters subsequently and by transmitting them to an external remote station.

It is possible to arrange the recording device outside the corresponding operating medium and transmit the device parameters through corresponding links. Also, it is possible to arrange the recording device directly inside, for example, a housing of an operating medium.

There are a plurality of device parameters which are correspondingly collected, stored and, if necessary, transmitted by means of the recording devices. Such device parameters are, for example, the temperature, pressure, humidity, force, time, current, battery capacity, designation and/or address of the operating medium, an error message, maintenance intervals or the like.

As a rule, the corresponding device parameters are associated with sensors, memory devices or the like inside the operating medium.

A temperature determination can be carried out, for example, at a lamp socket so as to monitor a possible temperature rise at the end of the service life of the lamp, or it may be determined at locations of the lighting fixture where the temperature constitutes a critical quantity with regard to explosion protection.

A pressure determination may be carried out in connection with the generation of an overpressure in a hollow seal of an operating medium or also in the overall operating medium so as to test the tightness of the seal or the operating medium, respectively.

As a rule, a humidity inspection likewise serves the testing of the tightness of the operating medium.

A corresponding force determination, too, may serve the testing of the tightness, for example, by generating an overpressure in a hollow seal and by determining the force transmitted from the seal to a force sensor as device parameter, whereby the corresponding force sensor may be provided in the sealing surface.

A determination of time serves, for example, the transmission of the operating period since the last maintenance so as to draw a user's attention to necessary maintenances at certain time intervals.

A current determination may serve the functional testing of the operating medium, a battery or other electric modules of the operating medium, whereby also ballasts of lamps can be tested.

To allow a unique assignment of the operating medium, also a corresponding designation and/or address of the operating medium may be determined as device parameter. In battery-driven operating media the battery capacity is a device parameter, for example, in order to allow a testing for the minimum battery capacity.

With lamps as operating media a light measurement may be carried out as device parameter, which serves, for example, the testing of the functionality of the lamps or the testing of a usage with a daylight-dependent circuit.

A corresponding collection of the device parameters may be accomplished at predetermined time intervals, but they may also be externally adjustable by the data communication interface.

Also, it is possible that, for example, an already collected and stored device parameter is collected and stored anew when this device parameter is subject to a change. Thus, the collection for storing the corresponding device parameters in the recording device is always up to date.

Also, it is possible that at least some device parameters are processed prior to storing them. Such a processing may be made with respect to stored programs or values for the device parameters. It can be determined, for example, whether a device parameter is within predetermined limit values, or a device parameter can be processed so as to generate from raw data supplied by sensors or the like direct measured values of a corresponding quantity. This may concern, for example, raw data supplied by sensors for the temperature, pressure, humidity, force or the like which are converted into corresponding temperature data, pressure data etc.

For storing the device parameters as well as other data, the memory device may be rewritable. However, the memory device may also comprise a read-only memory. For example, a designation for the operating medium, a date of the first operation, a period since the last maintenance, thresholds for quantities that are relevant in explosion-hazardous areas, thresholds for function-relevant quantities or also error cases for the calling of error messages are storable in the memory device, whereby it is possible, for example after a maintenance and a corresponding acknowledgment that the maintenance was performed, for a user to reset the time since the last maintenance. This also applies to thresholds of the corresponding quantities, such as the temperature at the lamp socket or the functionality of electric modules of the operating medium. Also, it is possible that a corresponding switching-off signal or a corresponding error message is outputted by the recording device when an error is detected in the operating medium. This may serve to switch off a light if the temperature at a lamp socket or the like is too high.

As was stated before, a corresponding transmission of the device parameters from the recording device can be initiated without an external calling, for example, if it is necessary to switch off the lamp or if the lamp has already been switched off, if a certain error message was received or the like. Also, it is possible to transmit the corresponding device parameters upon the request from the external remote station. In this connection, it is also possible that only some of the device parameters are transmitted or called selectively.

The calling and transmission of the device parameters may be accomplished in various fashions.

According to one possibility the data communication interface may be a bus interface for a bus line connected to the operating medium. Such a bus line may be a local or a field bus. In this way, the corresponding operating parameters are transmitted via the bus line, for example, to a central controller or a central computer as the external remote station. In certain instances, however, an independence of the transmission and the calling of the device parameters may be advantageous so that, for example, the transmission and calling are carried out wirelessly, wherein the data communication interface is a wireless transmission interface. Such interfaces are able to transmit the corresponding data by means of radio, infrared or the like. Examples are Bluetooth, WLAN etc.

In order to execute corresponding programs, and specifically also to process the device parameters, the recording device may comprise a microprocessor.

Specifically, the wireless transmission may serve the on-site transmission or calling of the device parameters by a portable external remote station, wherein such a portable remote station is, for example, a portable computer, a mobile phone with PDA function (Personal Digital Assistant), another PDA device, an organizer or the like.

In this connection, the portable remote station may serve to store the designation or the address of the operating medium and additionally, if available, information about the location or specific conditions of the operating medium. Such specific conditions are, for example, if explosion-hazardous areas are concerned, a zone information, e.g. zone 1 or zone 2. Moreover, a date of the first operation, a period since the last maintenance, a name of the user carrying out the inspection/maintenance, maintenance works, inspections or repairs etc. that were carried out, may be stored in the portable remote station. Such repairs are, for example, the replacement of a seal, the replacement of a battery, cleaning the operating medium etc.

Also storable are error messages, if parameters of corresponding temperature, pressure humidity, force or the like sensors exceed predetermined thresholds. Such an exceeded threshold may provide the user with information as to whether relevant quantities for the explosion protection are affected, whether an additional maintenance, repair or inspection is necessary and the like.

Also, if modules of the operating medium are affected with respect to their functionality, corresponding error messages about this functionality may be outputted and stored, whereupon the user can exchange, for example, corresponding wearing parts or whole modules. Moreover, it is possible to transmit and store a corresponding error message if a minimum battery capacity is no longer achieved. The user can thereupon check the battery and exchange it, if necessary.

The transmission of information or device parameters, respectively, may be accomplished both from the recording device to the portable remote station and partially in the reverse direction. This relates, for example, to the storage of the date of the first operation, the lighting fixture designation, especially if it is changed, or the storage of the address of the operating medium etc.

If necessary, a corresponding input of limit values, data or other quantities relevant for the recording device and, thus, for the operating medium may also be performed through an input device of the recording device. Such an input device is, for example, a keyboard, a touchscreen or the like. To supply the recording device with power it may be connected to a power supply of the corresponding operating medium. Likewise feasible is an own connection to a power supply provided, for example, in the building, so as to obtain an independence of the power supply by the operating medium. A battery operation is possible as well.

The different operating media are particularly arranged in explosion-hazardous areas, and such operating media are various lighting fixtures, such as linear fluorescent luminaries, mast lamps, emergency lights, suspended lamps or the like, switching devices, switchboards, controlling devices and possibly also switches or switching and distribution systems. Other operating media disposed particularly in explosion-hazardous areas can likewise be connected to the corresponding recording device. If necessary, such a recording device may also be associated with more than one operating medium, for example, if several lighting fixtures or other operating media are provided in a room of a building.

BRIEF DESCRIPTION OF THE FIGURES

The invention will be explained in more detail below by means of the figures illustrated in the drawing.

In the drawing.

DETAILED DESCRIPTION

Figure 1:
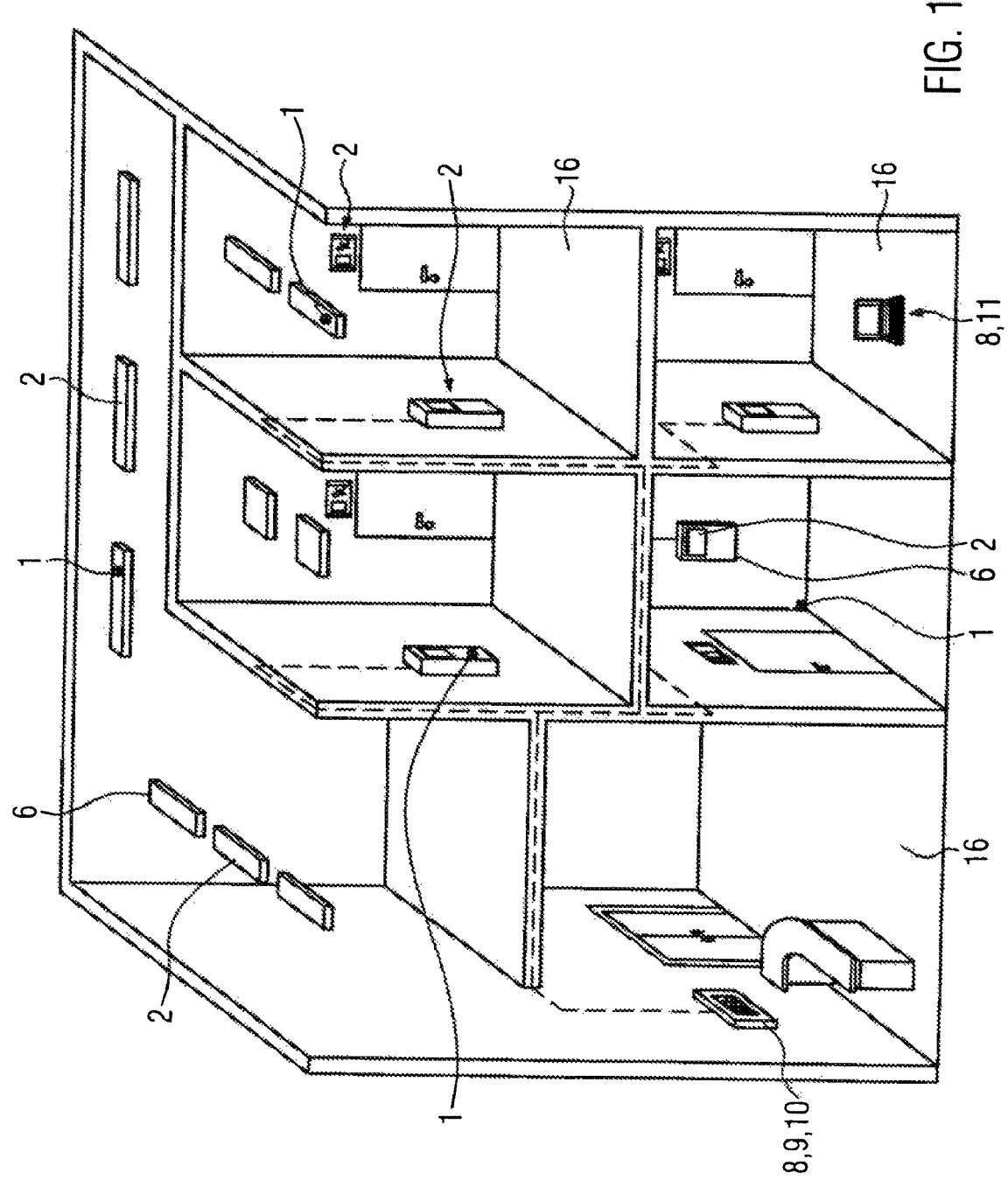
FIG. 1 shows a schematic representation of a building having some rooms in which inventive recording devices are associated with corresponding operating media.

FIG. 1 shows a schematic representation of a building having a number of rooms 16. In any one of the rooms different operating media 2 are arranged, such as linear fluorescent luminaries, emergency lights, suspended lamps, switching devices or also switching and distribution systems. Each single operating medium or a number of operating media is/are associated with a recording device 1. The recording device 1 is arranged inside a housing 6 of the corresponding operating medium or also at a corresponding location inside a room 16. If the recording device 1 is arranged remote from the corresponding operating medium 2 the collection of the device parameters may be accomplished through a connection to the operating medium or also wirelessly by means of radio, infrared or the like.

The different operating media inside the illustrated building are connected to a central controller 9 as an external remote station 8 of the recording devices 1. Such a central controller 9 may also be a central computer 10.

The transmission of corresponding device parameters may be accomplished from the recording device 1 to this central controller or computer, respectively, via a corresponding connection between the same and the operating media. Such a corresponding connection is, for example, a bus line such as a local or a field bus.

The device parameters can also be transmitted from the recording device 1 to a portable external remote station 8 in the form of a portable computer 11 or the like. The transmission of the device parameters may take place at predetermined times or also upon request by the external remote station 8.

Corresponding device parameters are, for example, the temperature, pressure, humidity, force, time, current, designation and/or address of the operating medium, the battery capacity, light and the like.

Also, it is possible to transmit programs or data from the external remote station 8 to the recording device 1. Such data relate, for example, to a designation of the operating medium, a date of the first operation, a date of the last maintenance, a name of the user who carried out the last inspection/maintenance, and the like. Furthermore, also thresholds for corresponding parameters of the operating medium may be stored, which are significant particularly for operating media in explosion-hazardous areas. Such parameters are, for example, the temperature or pressure. Moreover, thresholds for the function-relevant quantities of parts or modules of the operating medium may be stored, for example, in order to allow the monitoring of the functionality of the corresponding parts or modules. Also, it is possible to predefine certain cases of error which, if device parameters have specific quantities, lead to an error message by the recording device.

Figure 2:
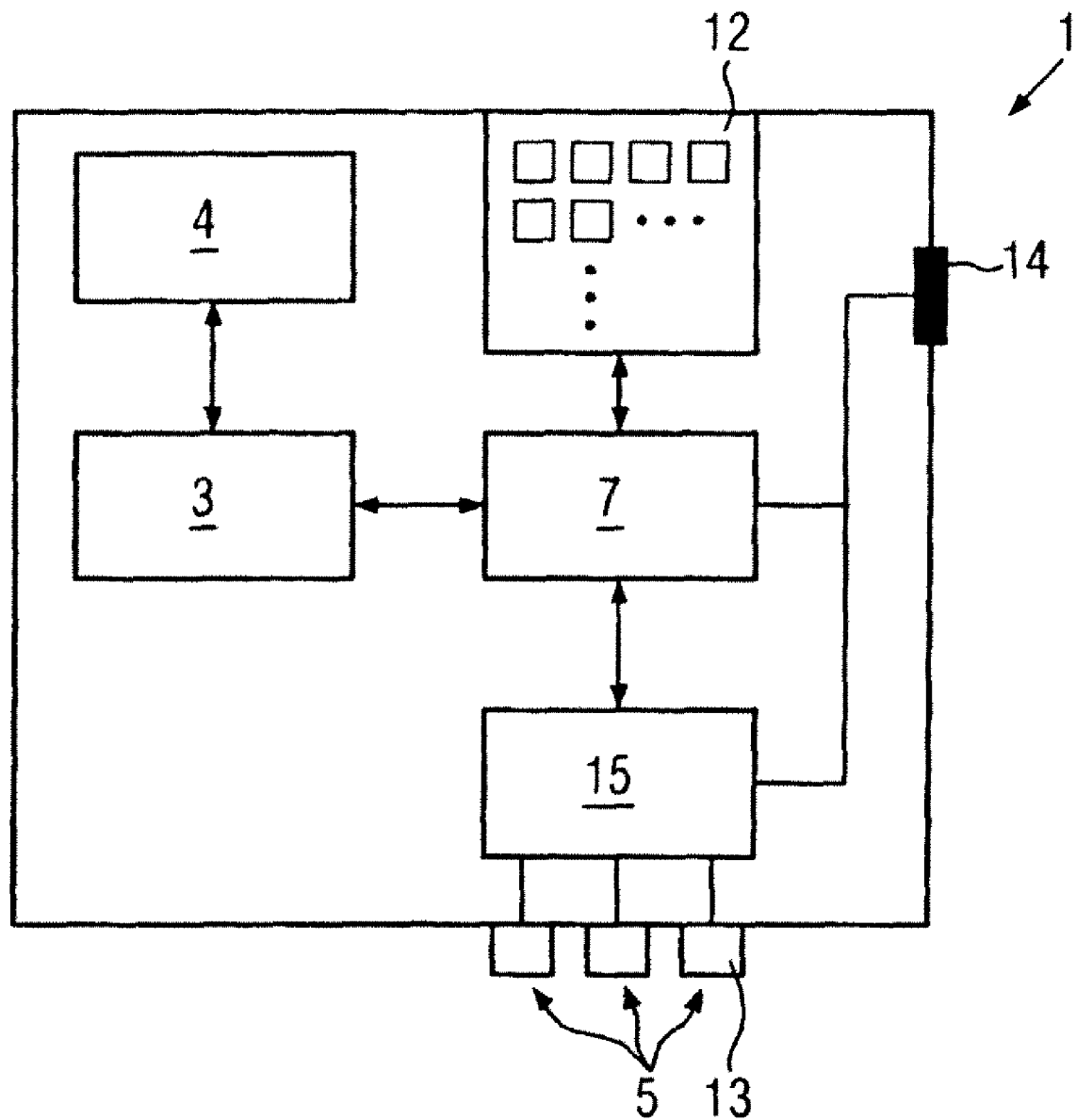
FIG. 2 shows a schematic representation of a recording device according to FIG. 1.

FIG. 2 shows a corresponding recording device 1 in a schematic representation.

The recording device may comprise an own device housing, or it may be integrated with its individual components in the corresponding operating medium. For retrofitting purposes an arrangement in an own housing is advantageous.

As a rule, a corresponding recording device 1 comprises a connection 14 for the supply of power. The corresponding power supply by the operating medium 2 may be realized by this connection. However, it is also possible to couple the recording device 1 directly with, for example, a power supply system which is integrated in a building, or to provide a specifically rechargeable battery in the recording device 1.

The power is then supplied to all electronic components of the recording device, e.g. the microprocessor 7, the interface controller 15, the memory device 4 or the data collection device 3. The memory device 4 can be rewritable or comprise rewritable memories and also read-only memories.

By means of the data collection device 3 a corresponding collection of the parameters is performed, if necessary by processing the device parameters by the microprocessor 7, and subsequently a storage in the memory device 4.

The interface controller 15 controls the data communication interfaces 5 which comprise, for example, a bus interface 13. Other data communication interfaces 5 may serve the wireless transmission by means of radio, infrared or the like. Examples for a radio transmission are Bluetooth, WLAN or the like.

Also, it is possible for the recording device 1 to comprise two or more data communication interfaces 5 specifically of different types.

The recording device 1 can communicate via the bus interface 13 with the central controller 9, see FIG. 1, and via a wireless interface with a portable remote station 8, 11.

If the recording device 1 is spaced apart from one or more of the operating media 2 assigned to it, the collection of corresponding device parameters can also be realized via one of the data communication interfaces 5.

For programming purposes, for the initialization, for the input of data and the like the recording device 1 can optionally comprise an input device 12. Such an input device 12 may be a keyboard, a touchscreen or the like. In addition to the input device 12, or also as an alternative, a recording device 1 according to the invention may also be provided with other signaling means for the visual indication of certain conditions, such as indicator lamps, LED lights and the like.

The recording device 1 may further comprise a data communication interface 5 in the form of an interface or the like, via which the recording device is connected to measuring sensors for temperature, pressure, humidity, current, voltage, time or the like. These measuring sensors may already be provided in the corresponding operating medium, or may also be installable or mountable together with the recording device. The corresponding measuring sensors are arranged at corresponding locations inside the operating medium, e.g. a temperature sensor in the proximity of an illuminating means or the like. Moreover, the corresponding data communication interface 5 may also be connected to actuators or the like inside the corresponding operating medium. Such an actuator can be, for example, a transistor switch, a relay or the like. The actuator can serve, for example, to switch off an illuminating means or other means of the corresponding operating medium if, for example, the temperature exceeds a certain value or also if a leakage inside the operating medium is detected which no longer guarantees the explosion protection.

In this connection it is likewise possible that the corresponding actuators are activated only in an emergency, for example, if corresponding parameters are outside predetermined limit values and these actuators are not controlled by a central controller. This can be the case, for example, if a connection to the central controller has broken down or other errors have occurred. Thus, the recording device also serves as an on-site controller.

In order to allow an easy connection to corresponding sensors, also standard plug contacts may be provided, for example, on a board or also on a housing of the recording device, by means of which, for example, a temperature, pressure, humidity sensor or other sensors is/are directly connectable. Thus, an easy connection between the measuring sensor and the recording device can be realized.

The invention claimed is:

1. A recording device associated with an explosion-proof operating device, the recording device comprising:
   at least one data collection device at least configured for collection, recording and transmission of device parameters of the explosion-proof operating device;
   a memory device connected to the at least one data collection device; and
   a data communication interface for transmitting the stored data to an external remote station, wherein the data communication interface is a wireless transmission interface wherein the external remote station is a portable central controller for a plurality of operating devices, and wherein the explosion-proof operating device is a luminaire, an emergency light, a suspended lamp, a switching device, or a switching and distribution system.

2. The recording device according to claim 1, wherein the recording device is arranged inside a housing of the explosion-proof operating device.

3. The recording device according to claim 1 or 2, wherein the device parameters are chosen from the group consisting of temperature, pressure, humidity, force, time, current, battery capacity, designation and/or address of the explosion-proof operating device, an error message, and maintenance intervals.

4. The recording device according to claim 1, wherein the memory device is rewritable.

5. The recording device according to claim 1, wherein the data communication interface is a bus interface for a bus line connected to the explosion-proof operating device.

6. The recording device according to claim 1, wherein the recording device further comprises a microprocessor wherein the microprocessor is configured to process the device parameters before the device parameters are stored in the memory device.

7. The recording device according to claim 1, wherein the external remote station is a central computer.

8. The recording device according to claim 1, wherein the recording device comprises an input device, wherein the input device is a keyboard or a touchscreen.

9. The recording device according to claim 1, wherein the recording device is connected to a power supply of the explosion-proof operating device.

10. A method for monitoring device parameters of an explosion-proof operating device, the method comprising:
    collecting, by a recording device, the device parameters of corresponding sensors or memory devices of the explosion-proof operating device;
    storing the device parameters; and
    transmitting the device parameters to an external remote station, wherein the external remote station is a portable central controller for a plurality of explosion-proof operating devices, wherein the transmitting the device parameters is performed wirelessly, and wherein the explosion-proof operating device is a luminaire, an emergency light, a suspended lamp, a switching device, or a switching and distribution system.

11. The method according to claim 10, wherein the collecting the device parameters is performed at predetermined time intervals.

12. The method according to claim 10 or 11, wherein at least one device parameter of the device parameters is collected and stored when a change of the at least one device parameter occurs.

13. The method according to claim 10, wherein a processing of the device parameters is performed prior to the storing the device parameters.

14. The method according to claim 10, wherein the transmitting the device parameters is performed upon request from the external remote station.

15. The method according to claim 10, wherein device parameters are transmitted and/or called selectively.

16. The method according to claim 15, wherein the transmission or calling of the device parameters is performed on site.

* * * * *